United States Patent Office 3,440,245
Patented Apr. 22, 1969

3,440,245
GLUTARIMIDOMETHYL AND β-METHYLGLUTAR-IMIDOMETHYL ESTERS OF CHRYSANTHEMUM CARBOXYLIC ACIDS
Takeaki Kato and Kenzo Ueda, Nishinomiya-shi, and Sadao Horie, Suita-shi, Toshio Mizutani, Amagasaki-shi, Keimei Fujimoto, Minoo-shi, and Yositosi Okuno, Nishinomiya-shi, Japan, assignors to Sumitomo Chemical Company, Ltd., a corporation of Japan
No Drawing. Filed Dec. 11, 1964, Ser. No. 417,806
Claims priority, application Japan, Dec. 17, 1963, 38/68,216; Dec. 28, 1963, 38/71,209
Int. Cl. C07d 29/22, 29/20; A01n 9/22
U.S. Cl. 260—281      7 Claims

ABSTRACT OF THE DISCLOSURE

Cyclopropanecarboxylic acid esters of the formula,

I. 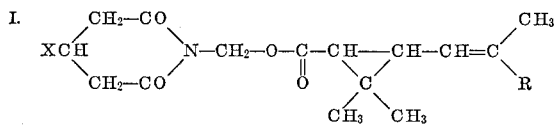

wherein X is hydrogen or methyl and R is methyl or methoxycarbonyl, the glutarimidomethyl and β-methyl glutarimidomethyl esters of chrysanthemum carboxylic acids, exhibit strong insecticidal properties with low toxicity to plants and to warm-blooded animals.

---

This invention relates to novel cyclopropanecarboxylic acid esters, to a process for preparing the same, and to insecticidal compositions containing the same. More particularly, it relates to novel cyclopropanecarboxylic acid esters having the general formula,

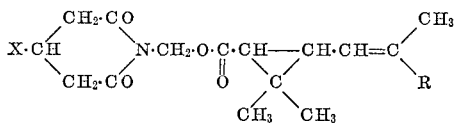

wherein X is a member selected from hydrogen atom and methyl radical, and R is a member selected from methyl and methoxycarbonyl radicals, to a process for preparing the same, and to insecticidal compositions containing the same.

It is one object of the present invention to provide a novel group of cyclopropanecarboxylic acid esters, particularly of chrysanthemum carboxylic acid esters, which have strong insecticidal activities to house and agricultural insects with low toxicities to warm-blooded animals and plants, and which can be commercially produced in low cost. Another object is to provide a process for preparing such novel esters by a commercially available procedure. Still another object is to provide insecticidal compositions containing such an ester. Other objects will be obvious from the following description.

As an insecticide utilizable with safety because of its harmlessness to warm-blooded animals, pyrethrum extract has long been employed. Recently, allethrin which is an analog of the effective ingredients in pyrethrum extract, i.e. pyrethrin and cinerin, was synthesized and developed for insecticidal uses. These ingredients are uniquely valuable in their high insecticidal powers, especially in their rapid effect upon insects and in the fact that insects develop little or no tolerance to them. However the use of these compounds is restricted by the complexity and difficulty of preparation and their relative high cost.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low costs. More specifically, the present compounds are glutarimidomethyl and β-methylglutarimidomethyl esters of chrysanthemum carboxylic acids. A significant feature of this invention is that the characteristic properties of these compounds are quite similar to those of pyrethrin, cinerin and allethrin, although the alcohol moieties of the former are extremely simple as compared to those of the latter and are composed of carbon, hydrogen, oxygen, and nitrogen atoms, whereas the latter are composed of carbon, hydrogen and oxygen.

Thus, the present invention provides novel cyclopropanecarboxylic acid esters having the formula,

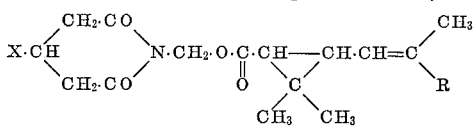

wherein X and R have the same meanings as identified above, and a process for preparing such compounds, comprising esterifying a glutarimide compound having the general formula,

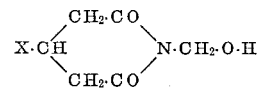

wherein X has the same meaning as identified above, with a cyclopropanecarboxylic acid having the general formula,

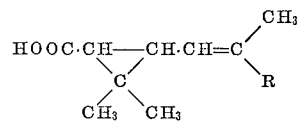

wherein R has the same meaning as identified above, according to the general esterifying procedure.

The glutarimide compounds employed in the present invention, in other words, N-(hydroxymethyl)-glutarimide, may be prepared from glutaric anhydride, or its imide compound, according to the conventional procedures well-known to those skilled in the art. For instance, N-(hydroxymethyl)-glutarimide may be prepared by reaction of glutarimide with formaldehyde or its low molecular weight polymer according to the conventional methylolation conditions in the presence or absence of an alkaline catalyst, such as sodium hydroxide and potassium carbonate, in a solvent, such as water, benzene, and toluene. Similarly, N-(hydroxymethyl)-β-methylglutarimide may be prepared.

The cyclopropanecarboxylic acid employed in the present invention is either chrysanthemic acid (chrysanthemum monocarboxylic acid, R being $CH_3$) or pyrethric acid (R being $COOCH_3$, am monomethyl ester of chrysanthemum dicarboxylic acid). They are the acidic moieties of pyrethrin, cinerin and allethrin, and can be synthesized according to known methods.

The esterification reaction of the present invention may be effected in various ways. The glutarimide compounds may be heated with the cyclopropanecarboxylic acid in the presence of a strong acid, such as aromatic sulfonic acid and sulfuric acid, in an organic solvent capable of azeotropically boiling with water, thereby to remove the water formed in the esterification, out of the reaction system. It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through the trans-esterification out of the reaction system. In such case, methyl, ethyl, n-propyl and isopropyl esters are suitable. In the most preferable esterification, it may be treated with the cyclopropanecarboxylic acid halide in an inert organic solvent, preferably in the presence of a de-hydrogen halide agent, such as pyridine, triethylamine and other tertiary amine whereby the esterification proceeds with the isolation of a hydrohalic acid salt within a short period of time. In this case, the acid chloride is the most preferably, though the bromide and the iodide may be employable. Further, it may be refluxed with the cyclopropanecarboxylic acid anhydride in an inert solvent for several hours, thereby to yield the objective ester and free cyclopropanecarboxylic acid, the latter being recovered and again converted to the anhydride by treatment with, for example acetic anhydride for reuse. Alternatively, the glutarimide compound may be employed for the esterification by once converting to the form of the halide having the general formula,

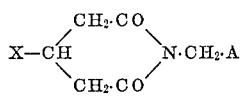

wherein X has the same meaning as identified above, and A means a halogen atom, by treatment with thionyl chloride or phosphorus trichloride etc. In this case, the halide may be heated with an alkali metal or ammonium salt of the cyclopropanecarboxylic acid in an inert solvent, yielding the desired ester with the isolation of an alkali metal or ammonium halide salt. Alternatively, the halide may be heated with the free acid in an inert solvent in the presence of a dehydrogen halide agent, such as tertiary amines. In the formula, A may be any of chlorine, bromine, and iodine, among which the former two are preferable and practical. As the alkali metals, sodium and potassium are preferable.

As is well-known, the cyclopropanecarboxylic acid as identified above comprises various stereoisomers and optical isomers. The several derivatives described herein likewise include various isomers.

The process of the present invention is described in more detail with reference to the following examples, which are however to be construed for the purpose of illustration and not of the limitation.

Example 1

Fourteen point three grams (0.1 mol) of N-hydroxymethyl)-glutarimide was dissolved in a mixture of 60 ml. of dry toluene and 12 g. of dry pyridine.

A solution of 19.2 g. (0.102 mol) of chrysanthemoyl chloride (a mixture of cis- and trans-isomers) in 60 ml. of dry toluene was dropped to the mixture while being stirred at a temperature below 40° C. The reaction vessel was tightly closed and allowed to stand overnight.

The reaction mixture was washed successively with a 5% hydrochloric acid, a 1% sodium hydroxide solution and a saturated sodium chloride solution, and dried over sodium sulfate. After filtration, the solution was purified by passing through an alumina column. Evaporation of the solvent in vacuo yielded 24.6 g. (84% yield) of N-(chrysanthemoxymethyl)-glutarimide, white crystals, M.P. 85°–90° C.

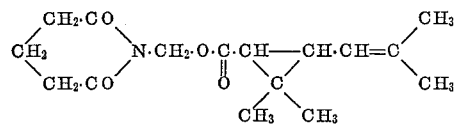

Analysis.—Calculated (as $C_{16}H_{23}NO_4$): C, 65.51; H, 7.90; N, 4.78%. Found: C, 65.74; H, 7.82; N, 4.81%.

Example 2

A mixture of 14.3 g. (0.1 mol) of N-(hydroxymethyl)-glutarimide, 31.8 g. (0.1 mol) of chrysanthemic acid anhydride (a mixture of cis- and trans-isomers) and 100 ml. of dry toluene was refluxed for 3 hours. After cooling the reaction mass was washed with an aqueous 3% sodium hydroxide solution at a temperature below 10° C., thereby to remove the by-produced chrysanthemic acid. The reaction mass was then washed with a saturated sodium chloride solution, thereby to remove the alkali, dried on sodium sulfate, and thereafter treated as described in Example 1 to obtain 23.9 g. (81.5% yield) of N-(chrysanthemoxymethyl)-glutarimide.

Example 3

A mixture of 16.2 g. (0.1 mol) of N-(chloromethyl)-glutarimide, obtained by the reaction of N-(hydroxymethyl)-glutarimide with phosphorus trichloride in acetone at a room temperature, and 21.2 g. (0.1 mol) of trans,trans-pyrethric acid was dissolved in 200 ml. of acetone, and 11.1 g. (0.11 mol) of triethylamine was dropped into the solution at room temperature while being stirred. Thereafter, the mixture was refluxed for 2 hours. The reaction mixture was cooled and filtered to remove the insoluble amine hydrochloride. The filtrate was evaporated in vacuo to remove the solvent, and the residue was dissolved in 200 ml. of dry toluene. The solution was washed with water and dried over sodium sulfate, and thereafter treated as described in Example 1 to obtain 26.6 g. (79% yield) of N-(trans,trans-pyrethroxymethyl)-glutarimide, pale yellow extremely viscous liquid.

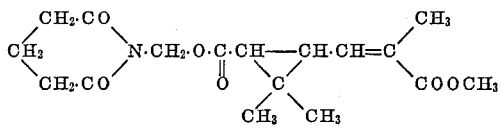

Analysis.—Calculated (as $C_{17}H_{23}NO_6$): C, 60.52; H, 6.87; N, 4.15%. Found: C, 60.48; H, 6.88; N, 4.21%.

Example 4

In similar way as described in Example 1, 15.7 g. (0.1 mol) of N-(hydroxymethyl)-β-methylglutarimide was allowed to react with 23.5 g. (0.102 mol) of trans,trans-pyrethroyl chloride to yield 27.0 g. (77% yield) of N-(trans,trans-pyrethroxymethyl)-β-methylglutarimide, pale yellow viscous liquid.

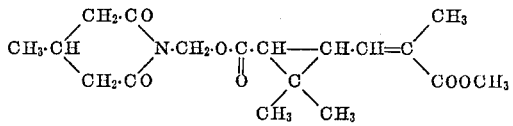

Analysis.—Calculated (as $C_{18}H_{25}NO_6$): C, 61.52; H, 7.17; N, 3.99%. Found: C, 61.38; H, 7.15; N, 4.02%.

Example 5

In similar way, as described in Example 3, 17.6 g. (0.1 mol) of N-(chloromethyl)-β-methylglutarimide, obtained by the reaction of N-(hydroxymethyl)-β-methylglutarimide with thionyl chloride in acetone at room temperature, was allowed to react with 16.8 g. (0.1 mol) of chrysanthemic acid (a mixture of cis- and trans-isomers) to yield 26.3 g. (85.5% yield) of N-(chrysanthemoxymethyl)-β-methylglutarimide (a mixture of cis- and trans-isomers), pale yellow liquid, $n_D^{20}$ 1.5050.

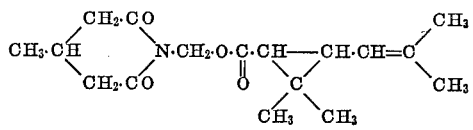

Analysis.—Calculated (as $C_{17}H_{25}NO_4$): C, 66.42; H, 8.20; N, 4.56%. Found: C, 66.49; H, 8.18; N, 4.44%.

As mentioned above, the present esters possess superior insecticidal power, and exhibit rapid knock-down and excellent killing effect to house flies, mosquitoes, cockroaches, etc. Moreover, these esters are especially useful for sanitary and domestic purposes, because of their rapid effectiveness and harmlessness. The present esters are suitably employed for the preparation of insecticidal compositions which have broad uses, correlatively with the low cost.

For the formulation of the insectidal composition containing the present compound as the essential active ingredient, oil solution, emulsifiable concentrate, wettable powder, dust, aerosol, mosquito coil, bait and other preparations, may be formulated using the generally employed carriers, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethroids, for example, pyrethrum extract and allethrin, organochlorine and organophosphorus compounds, synergistic agent for pyrethroide, for example, piperonyl butoxide, piperonyl sulfoxide, $\beta$-butoxy-$\beta'$-thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O-dimethyl-O-(3-methyl-4-nitrophenyl) thiophosphate, malathion, diazinone, dimethoate, $\gamma$-BHC, and others, to yield a pesticidal composition which possesses high insecticidal activity with rapid effectiveness. In such cases, the both components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula 1. 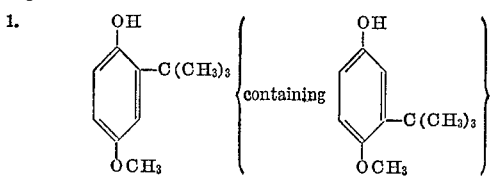

2. 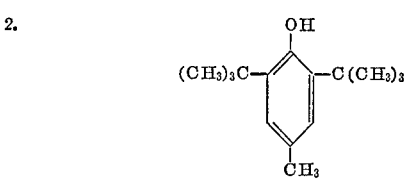

3. 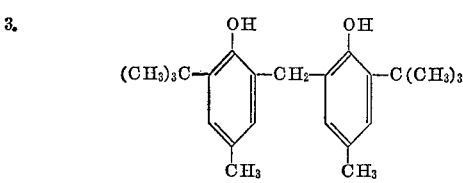

4. 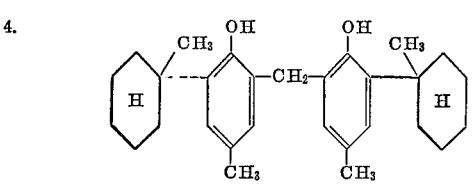

The amount of the stabilizer, if added, may be less than 1% by weight of the present ester, ordinarily from 1 to 0.1%.

The followings are the illustrations of the insecticidal compositions containing the cyclopropanecarboxylic acid esters according to the invention and of the insecticidal activities.

Example 6

A solution of 2 g. of N-(chrysanthemoxymethyl)-glutarimide in 10 g. of xylene was diluted with a kerosene to make the volume 100 ml., whereby 2% oil preparation was obtained.

Ten millilitres of the resulting 2% oil preparation was sprayed onto house flies (adult) in a settling-tower (Mc Callan, S. E. A., Wellman, R. H., Contributions of Boyce Thomapson, Inst. vol. 12, p. 451, 1942) within 10 seconds. After 10 seconds, the shutter was opened and the house flies were exposed to the sprayed mist for 10 minutes and then taken out from the settling tower. The house flies were kept at a constant temperature, and the mortality was examined after 20 hours. The mortality was higher than 90%.

Example 7

A solution of 0.3 g. of N-(trans,trans-pyrethroxymethyl)-glutarimide in 3 g. of xylene was diluted with a refined kerosene to make the volume 100 ml., whereby 0.3% oil preparation was obtained.

In a glass box of 70 cm. cube, about 30 house flies (adult) were liberated, and 0.3 ml. of the thus-prepared 0.3% oil preparation was uniformly sprayed with an atomizer into the box. Knock-down number of the house flies according to the lapse of time were observed. Similarly, a 0.3% oil preparation containing allethrin was tested for comparison.

KNOCK-DOWN RATIO OF HOUSE FLIES ACCORDING TO THE LAPSE OF TIME (PERCENT)

| | 30 sec. | 1 min. | 2 min. | 4 min. | 8 min. | 11⅓ min. |
|---|---|---|---|---|---|---|
| The present compound (0.3%) | 4.4 | 10.2 | 40.0 | 60.6 | 75.0 | 84.0 |
| Allethrin (0.3%) | 0 | 6.7 | 32.2 | 61.3 | 80.7 | 86.1 |

Example 8

An emulsifiable concentrate was obtained by uniformly mixing 20 g. of N-(chrysanthemoxymethyl)-$\beta$-methylglutarimide, 10 g. of Sorpol SM-200 (a surface active agent, a trade name of Toho Chemical Co., Ltd.), and 70 g. of xylene in the described order.

The resulting 20% emulsifiable concentrate was diluted in water of 10 times weight and the emulsion was sprayed to a favorite habitat of house flies in an amount of 50 ml./m.$^2$. The emergence of house flies was prevented almost completely.

Example 9

A solution of 1.5 g. of N-(trans,trans-pyrethroxymethyl)-$\beta$-methylglutarimide in 20 g. of acetone was well mixed with 98.5 g. of 200 mesh talc in a mortar, and the acetone was evaporated from the mixture to leave 1.5% dust preparation.

About 50 house flies (adult) were put in a deep dish and covered with a wire netting, which was then set at the bottom of the settling tower.

One gram of the resulting dust preparation was sprayed upwardly at a pressure of 20 lbs./inch$^2$. After 10 seconds, the shutter was opened and the house flies were exposed to the falling sprayed powder for 10 minutes and then taken out from the tower. The house flies were kept at a constant temperature of 27° C. and the mortality was examined after 20 hours. The mortality was higher than 90%.

What we claim is:

1. A cyclopropanecarboxylic acid ester having the formula,

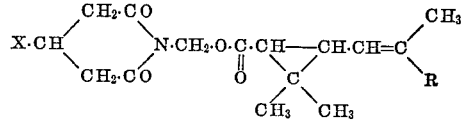

wherein X is a member selected from hydrogen and methyl, and R is a member selected from methyl and methoxy carbonyl.

2. The ester according to claim 1 wherein R is methyl.

3. The ester according to claim 1 wherein R is methoxy carbonyl.

4. A cyclopropanecarboxylic acid ester having the formula,

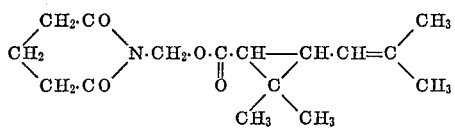

5. A cyclopropanecarboxylic acid ester having the formula,

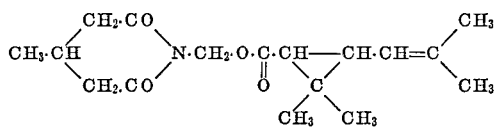

6. A cyclopropanecarboxylic acid ester having the formula,

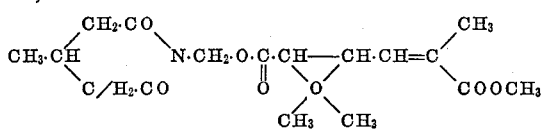

7. A cyclopropanecarboxylic acid ester having the formula,

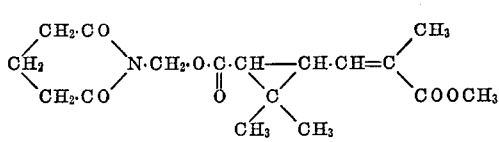

References Cited

UNITED STATES PATENTS

| | | | |
|---|---|---|---|
| 3,310,463 | 3/1967 | Hopkins et al. | 161—24 |
| 3,318,766 | 5/1967 | Kato et al. | 260—326.3 |
| 2,717,262 | 9/1955 | Cole | 260—468 |
| 2,863,801 | 12/1958 | Kuhle et al. | |
| 3,261,838 | 7/1966 | Wakeman et al. | 260—286 |
| 3,266,984 | 8/1966 | Ueda et al. | 167—33 |
| 3,268,396 | 8/1966 | Kuramoto et al. | 167—33 |
| 3,312,706 | 4/1967 | Rigterink | 260—281 |

ALEX MAZEL, *Primary Examiner.*

D. G. DAUS, *Assistant Examiner.*

U.S. Cl. X.R.

260—514, 468, 613; 424—263, 306